UNITED STATES PATENT OFFICE.

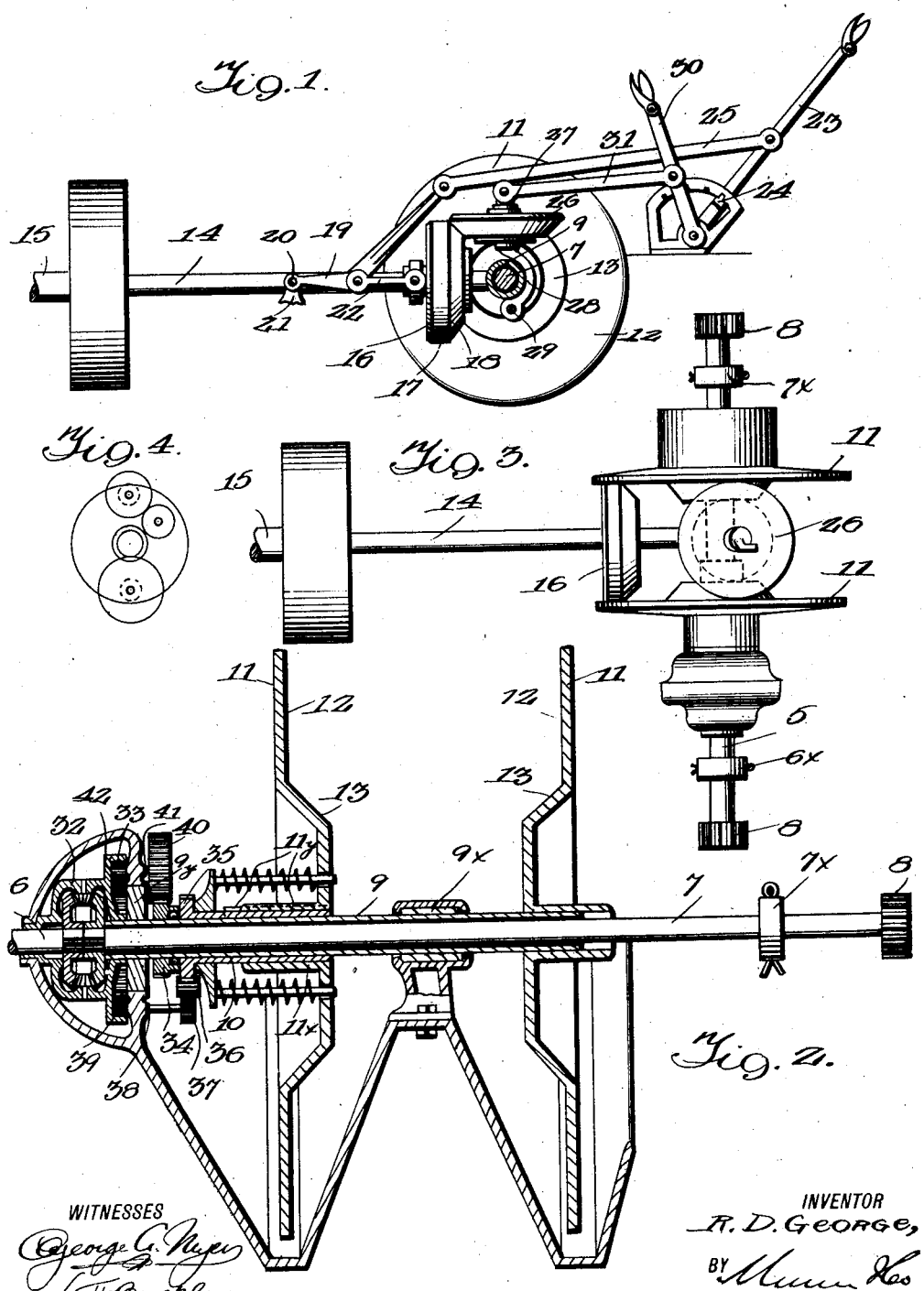

RALPH DOUGLASS GEORGE, OF KANSAS CITY, MISSOURI.

TRANSMISSION-GEARING.

1,391,314.

Specification of Letters Patent.  Patented Sept. 20, 1921.

Application filed June 18, 1920.  Serial No. 389,898.

*To all whom it may concern:*

Be it known that I, RALPH DOUGLASS GEORGE, a citizen of the United States, and a resident of Kansas City, in the county of Jackson and State of Missouri, have invented a new and useful Improvement in Transmission-Gearing, of which the following is a specification.

My invention relates to an improvement in transmission gearing and more particularly to an improvement in that type of transmission gearing forming the subject-matter of my prior Patents 1,267,321 and 1,234,007.

The object of the invention is to provide an improved transmission gearing especially adapted for use with tractors which provides for an efficient transmission of the motion at all engine speeds, which is of simple and durable construction and which may be easily and readily operated to vary the speed and direction of the transmission of the motion.

Other objects and advantages reside in certain novel features of construction, arrangement and combination of parts which will be hereinafter more fully described and particularly pointed out in the appended claims, reference being had to the accompanying drawings in which—

Figure 1 is a sectional view on line $x$—$x$ of Fig. 3;

Fig. 2 is an end elevational view;

Fig. 3 is a top plan; and

Fig. 4 is a diagrammatic view illustrating the transmission of the motion from the sleeve to the sections of the driven shaft.

Referring to the drawings the driven shaft indicated generally at 5 embodies two sections 6 and 7. A pinion 8 is carried on the outer end of each section and is adapted to drive the traction wheels (not shown) or the like, of the tractor. Each of the sections 6 and 7 have their outer ends carried in suitable bearings $6^x$ and $7^x$, respectively, and their inner ends journaled in the respective hubs of the differential.

An inner driven disk sleeve 9 is arranged concentrically on the section 7 of the driven shaft and spaced therefrom. The sleeve is journaled in bearings $9^x$ and $9^y$, as clearly shown in Fig. 3. An outer driven disk sleeve 10 is loosely mounted on the inner sleeve 9 to be supported thereby. A driven disk 11 is carried by each of the sleeves. The driven disks 11 are spaced and each has a flat face 12 and an integral beveled portion or gear 13 adjacent to and concentric with the center of the disk. As clearly shown in Fig. 3, one of the disks 11 is fixed directly to the sleeve 9 while the other of said disks is provided with a hub $11^x$ splined at $11^y$ to the sleeve 10 so as to be constrained to rotate with the sleeve while freely slidable thereon.

A driving shaft 14 is arranged at right angles to the driven shaft 5, the driving shaft being a part of or directly connected to the engine shaft 15. A driver or driving gear 16 is splined to the outer end of the drive shaft 14 being constrained to partake of any rotary motion of the drive shaft but being freely slidable thereon. The driver 16 has a peripheral driving face 17 adapted to engage and transmit motion to the flat face 12 of each of the driven disks 11 and is also provided with a beveled surface 18 adapted to engage and transmit motion to the beveled surface 13 of each of the driven disks. This engagement of the driving and driven elements at high speeds provides for an efficient transmission of the motion.

The operating mechanism for the driver consists of an angle lever 19 fulcrumed at 20 to a stationary support 21. A link 22 connects the elbow of the angle lever to the collar of the driver as shown in Fig. 1. A control lever 23 having rack-and-segment means 24 for maintaining it in adjusted position actuates and controls the angle lever 19 through the connecting rod 25. The angle lever 19 and its link 22 constitutes a toggle, and the arrangement is such that the pivotal connection of the link 22 to the elbow of the angle lever is positioned at high speed beyond the dead center, thereby locking the lever in high speed independently of the rack-and-segment 24.

The reversing mechanism consists of an intermediate beveled pinion 26 rotatably mounted on the stub shaft 27 which is integrally formed at the upper end of the curved arm 28 pivoted at 29 to a suitable stationary support. The beveled pinion 26 of the reversing mechanism is actuated by a control lever 30 connected to the pinion by a connecting rod 31. The beveled pinion 26 is of a radius slightly greater than the greatest radius of the driver 16 so that when the beveled pinion 26 is moved into operative position with its beveled surface operatively engaging the beveled surface 13 of each of the driven disks it displaces the driven disk axially along the driven shaft thereby spacing the driven disks from the driver. The driver may then be engaged with the beveled gear 26 and it transmits its motion to the beveled gear 26 which in turn communicates its motion to the disks 11.

Means is provided for transmitting the motion of the disks from their sleeves to the sections of the driven shaft. This means includes a differential 32 which connects the sections of the driven shaft and is provided with an internal gear 33. The internal gear 33 constitutes the master gear of the differential. The inner sleeve 9 and the outer sleeve 10 carry pinions 34 and 35 respectively at their ends adjacent the differential. The pinion 35 meshes with an idler 36 which in turn engages a gear 37 carried on one end of a countershaft 38. The opposite end of the countershaft 38 carries a pinion 39 which meshes with the internal gear of the differential. The pinion 34 meshes with a gear 40 carried on one end of a second countershaft 41, the opposite end of which carries a pinion 42 which meshes with the internal gear of the differential opposite the point at which the pinion 39 engages the internal gear.

In operation it will be seen that the motion of the driving shaft is communicated by the driver to the driven disks which are rotated in opposite directions. The driven disks being fixed to the sleeves 9 and 10, rotate the sleeves in opposite directions. The gearing, however, which transmits the motion of the sleeves to the differential, reconverts this motion into motion in the same direction so that the differential imparts torque in the same direction to the sections of the driven shaft.

I claim:

1. In a transmission gearing of the character described, a driven shaft including two sections, a differential connecting said sections and having an internal gear constituting its master gear, an inner sleeve loosely mounted on one of said sections, an outer sleeve loosely mounted on said inner sleeve, a driven disk carried by each of said sleeves, gearing including pinions engaged with the internal gear of the differential transmitting motion in the same direction from said sleeves to said differential, a drive shaft, a driver on said shaft engageable with the driven disks and reversing mechanism including a reversing gear adapted to transmit and reverse the motion from the drive shaft to the driven disks and to automatically disengage the driver and driven disks when it engages the driven disks.

2. In a transmission gearing of the character described, a driven shaft including two sections, a differential connecting said sections and having an internal gear constituting its master gear, an inner sleeve loosely mounted on one of said sections, an outer sleeve loosely mounted on said inner sleeve, a driven disk carried by each of said sleeves, gearing transmitting motion in the same direction from said sleeves to said differential, a drive shaft, and a driver on said shaft engageable with the driven disks.

3. In a transmission gearing of the character described, a driven shaft including two sections, a differential connecting said sections and having an internal gear constituting its master gear, an inner sleeve loosely mounted on one of said sections, an outer sleeve loosely mounted on said inner sleeve, a driven disk carried by each of said sleeves and separate gearing transmitting the motion of each of said sleeves to said driven shaft, each of said gearings including a driven pinion engaging the internal gear of the differential.

4. In a transmission gearing of the character described, a driven shaft including two sections, a differential connecting said sections and having an internal gear constituting its master gear and means for driving said driven shaft through said differential including a driving pinion engaging the internal gear thereof.

5. In a transmission gearing of the character described, a driven shaft, a driven disk on said driven shaft, a drive shaft, a driver on said drive shaft engageable with the driven disk, spring means for resiliently maintaining said driver and said driven disk in engagement, and reversing mechanism including a reversing gear adapted initially to be engaged with the driven disk to automatically disengage it from the driver against the action of said spring means, and finally to engage the driver and driven disk whereby it transmits a reverse motion from the drive shaft to the driven shaft.

6. In a transmission gearing of the character described, a driven shaft, a pair of driven disks on said driven shaft, a drive shaft, a driver on said drive shaft engageable with the driven disks, and reversing mechanism including a reversing gear of greater radius than the driver adapted to transmit and reverse the motion from the drive shaft to the driven shaft and to automatically disengage the driver and driven disks when it engages the driven disks.

RALPH DOUGLASS GEORGE.